Feb. 26, 1952 M. J. WEISFELDT 2,587,018

APPARATUS TO RECORD IMAGES OF MOVING SUBJECTS

Filed March 5, 1946 4 Sheets-Sheet 1

INVENTOR.

MAX J. WEISFELDT

BY [signature]

ATTORNEY

INVENTOR.
MAX J. WEISFELDT
BY [signature]
ATTORNEY

APPARATUS TO RECORD IMAGES OF MOVING SUBJECTS

Filed March 5, 1946 4 Sheets-Sheet 3

INVENTOR.
MAX J. WEISFELDT

BY Tobias O. Keppler
ATTORNEY

APPARATUS TO RECORD IMAGES OF MOVING SUBJECTS

Filed March 5, 1946 4 Sheets-Sheet 4

INVENTOR.
MAX J. WEISFELDT
BY Tobias O. Teppler
ATTORNEY

Patented Feb. 26, 1952

2,587,018

UNITED STATES PATENT OFFICE 2,587,018

APPARATUS TO RECORD IMAGES OF MOVING SUBJECTS

Max J. Weisfeldt, New York, N. Y.

Application March 5, 1946, Serial No. 652,150

9 Claims. (Cl. 88—16)

This invention relates to improvements in image recording apparatus and the like.

In recording images of moving subjects, an image recording device (such as a motion picture camera) must frequently be oriented, simultaneously, in azimuth about a substantially vertical axis, and in elevation about a substantially horizontal axis. At the same time other adjustments must be made, such as the focusing of the camera lens relative to the distance between the device and the subject. In addition, if images of the subject are to be recorded as said subject moves along a relatively long path, it may be necessary to use a plurality of such recording devices, thereby resulting in a like augmentation of personnel to operate said devices.

The present invention provides means whereby a plurality of recording devices, sufficient to suitably cover all portions of a long course followed by a subject, may be operated, with a limited amount of personnel, from a single control station (which will be referred to hereinafter as a "master" station). This is accomplished by providing a plurality of subsidiary stations ("slave" stations) each of which is equipped with one or more image recording devices, the operations of which are automatically controlled from the master station. The master station includes a suitable tracking means and may or may not include an image recording device as well. The master station is located at a point from which the entire course can be covered, either visually or by other suitable detection means, and the slave stations are at locations suitable for covering particular portions of said course.

The master station is coupled to the slave stations by suitable remote control means in such a way that, when detecting or sighting means at the master station are directed at a subject located at a particular point on a course along which the subject is moving, image recording devices located at one or several slave stations covering said point will also automatically be directed at the same point. Thus, as a subject moving along its course is continuously tracked from the master station, it will also simultaneously be tracked continuously or successively from one or more of the slave stations.

One situation where such apparatus may have particular usefulness is in connection with the taking of motion pictures, or the televising, of a horse race. Although, in the present specification, the invention will be illustrated in connection with such specific use, it will of course be understood that the invention is not to be deemed limited thereto, but has far more extensive and broader applications.

In taking motion pictures of a horse race, it is usual for several photographers to position themselves in or on top of the grandstand and also at several other vantage points about the course. Results are far from satisfactory however for many reasons, such as the fact that some portions of the course are at too great a distance from each camera, there is a great difference in the distances from the camera to the farthest and to the nearest points of the course, and the cameraman's view is often interfered with by spectators and others and by structures, such as parts of the grandstand.

The cameraman, in order to follow the horses throughout the race must usually swing the camera about in such a way as to combine both azimuthal and elevational motions, which at times is rather awkward. As the distance between the camera and the horses varies greatly throughout the progress of a race, it becomes important for clear images to properly vary the focus of the camera lens as a race progresses.

Frequently there have been charges of foul play against jockeys but it has been difficult, if not impossible, to prove or disprove such charges by motion pictures taken in the past or by any other conventional means. The present invention provides improved means for overcoming the difficulties aforementioned, as well as others.

In applying my invention to the taking of motion pictures of a horse race, one or more master stations may be positioned in towers preferably located in the central field of the race course. Although the master station may be positioned at a point high up in the grandstand where fair visibility of the entire course may be possible, that is not the best procedure. By using a centrally located tower, unobstructed visibility is assured and the pictures are preferably taken at a more satisfactory elevational angle.

In addition, a plurality of slave stations are judiciously positioned closer to the course to more suitably cover particular portions thereof. The slave stations are best located along the outer periphery of the course although some or all of them may be positioned along the inner periphery thereof.

As the moving horses need only be tracked from the master station to cause automatic tracking from the slave stations, an entire race can be satisfactorily photographed with a limited number of operators and each part of the course is so well covered by one or more cameras that every detail of the race will be clearly photographed for discerning and evidencing fouls, for newsreel purposes, etc. In addition, fouls will probably disappear when jockeys know that, throughout a race, they are being photographed by a plurality of strategically located cameras.

In so far as the master station is concerned, the camera or sighting means may be oriented in azimuth either manually or automatically. In either case elevational orientation will be automatic. Although installations similar to the manually operated master installations may be used at the slave stations, they will preferably be completely automatized in all cases. In the first two forms of my invention shown herein (Figure 5–7 and 11–12), the operator need only swing the camera so as to orient it in azimuth while the elevational orientation thereof and the focusing of the lens are accomplished automatically. In the third form of my invention (Figures 13–15) hereinafter described, the orientation in azimuth also is accomplished automatically.

The master installation may include tracking means only or may also incorporate a motion picture camera provided with suitable telephoto lens. The apparatus of the master station is preferably coupled to the slave stations by suitable gear trains and synchronous motors so that, as the sighting means of the master station are swung in azimuth to follow the horses about the course, the cameras at the several slave stations will also be swung in azimuth, but in such predetermined relationship that one or more of said slave cameras will also follow the horses.

The present invention may be used in various applications and may well be used for military purposes. For example, it might be used for gun directing. Assume a narrow ship channel at the entrance to a harbor or going up a river. A master station might be located on a hilltop where the entire length of the channel would be visible or could be covered by suitable detecting means. A plurality of slave stations, each of which would include one or more guns, would be located at various points along the channel and within firing range of it. As a ship progressed along the channel, the master installation would track it continuously, thereby keeping the various slave installations suitably oriented so as to direct the several guns, located respectively at said stations, so that as the ship came successively into their range they would be automatically aimed at it and could be fired either remotely or locally.

One of the objects of the present invention is to provide means for facilitating the recording (by the use of motion picture, television or other means) of the entire action of some event involving moving subjects, such as a horse race, auto race, athletic contest, parade, etc.

Another object is to provide means by which fouls or other improper or unfair tactics by contestants may be readily detected and evidenced.

Another object is to provide an apparatus whereby moving subjects may be kept clearly in view of a recording device at all times without interference by any objects or persons.

Still another object of this invention is to provide means for automatically sighting a recording device so as to keep it aimed at a moving subject at all times.

Another feature of this invention is to provide a mechanism which automatically adjusts the focus of a recording device in accordance with variations in the distance between said device and a subject.

Another object is to provide means whereby a continuous reproduction of images of an event, involving moving subjects, may be had.

Yet another object is to accomplish the foregoing either entirely or partly by automatic means so as to require the services of fewer, or of less experienced, operators than would otherwise be needed.

Another object is to automatize some of the steps necessary to recording images of moving subjects so as to reduce the operations required of the operator and thereby reduce the possibility of poor results due to the human element.

Still another object is to provide means whereby a slave device may be caused automatically to track a moving subject simultaneously with the tracking of said subject by a master device.

Another object is to provide means whereby a moving subject may be automatically tracked from a plurality of slave stations while it is being tracked from a master station.

Yet another object is to provide means for transforming rotational motion into nonsynchronous rotational motion having a predetermined relationship thereto.

Other objects and advantages will become apparent from the following description of preferred embodiments of the invention, in which Figure 1 is a plan view of a horse race course wherein are shown one centrally located master station and eight slave stations spaced about the outside of the course;

Figure 1:
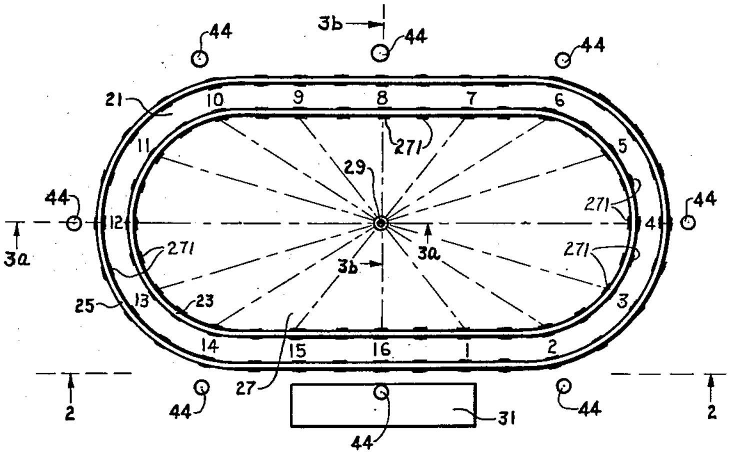

Referring now to the drawings, and particularly to Figures 1–4, there is shown a typical horse race course 21 which has the configuration of a straight-sided oval and is delimited by an inner rail 23 and an outer rail 25. Horses and jockeys on the course 21 are designated by the numeral 26. The inner rail 23 encloses a central field 27. The course 21 has been marked off with sixteen positions 1–16 which are spaced substantially equally about the said course.

Figure 2:
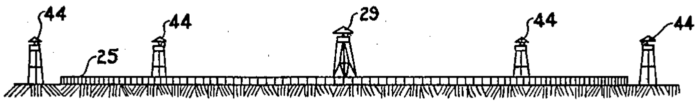
Figure 2 is a vertical sectional view of Figure 1 taken along the line 2—2 thereof.
Figure 3:
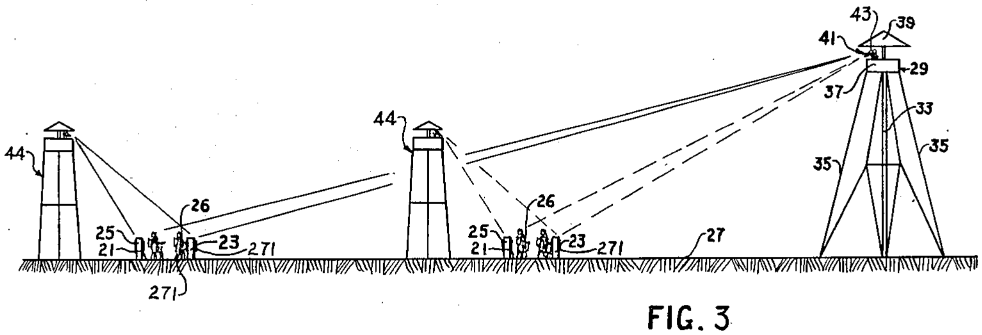
Figure 3 is a composite view of two superimposed enlarged vertical sections taken along the lines 3a—3a and 3b—3b of Figure 1.

As shown in Figures 1–3, a tower 29 is positioned at the central point of the central field 27. Said tower 29 should be as steady as possible and preferably quite tall and constructed of strong but narrow materials which will offer a minimum of windage and which will not interfere with the spectators' view from a grandstand 31.

Figure 4:
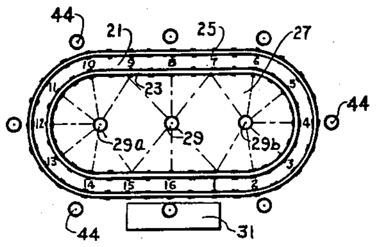
Figure 4 is a plan view of a modified form of the present invention wherein three installations are shown inside the race course, at least one of which is a master device, and a plurality of slave installations outside the course.

The tower 29 (Figure 3) may include a central mast 33 sustained by guys 35 and topped by a crow's-nest 37, above which is sustained a canopy 39 to protect the operator and equipment. The crow's-nest 37 houses a camera orientating apparatus 41 and at least one motion picture camera 43. The canopy 39 may be a permanent structure, but is preferably a removable, collapsible, lightweight, umbrella-like affair.

Where there is but a single central tower 29 (as in Figures 1–3) the camera orientating apparatus 41 will be a "master" installation, already referred to and more fully explained hereinafter. However, particularly at a large race course 21, it may be advantageous to locate several towers 29, 29*a*, 29*b* (three being shown in Figure 4) in the central field 27. Then, one or more of said towers 29, 29*a*, 29*b* will be a master station. Located at suitable points about the course 21 are a plurality (Figures 1 and 4 show eight) of subsidiary towers 44, preferably of a smaller height, which will house slave installations.

Figure 5:
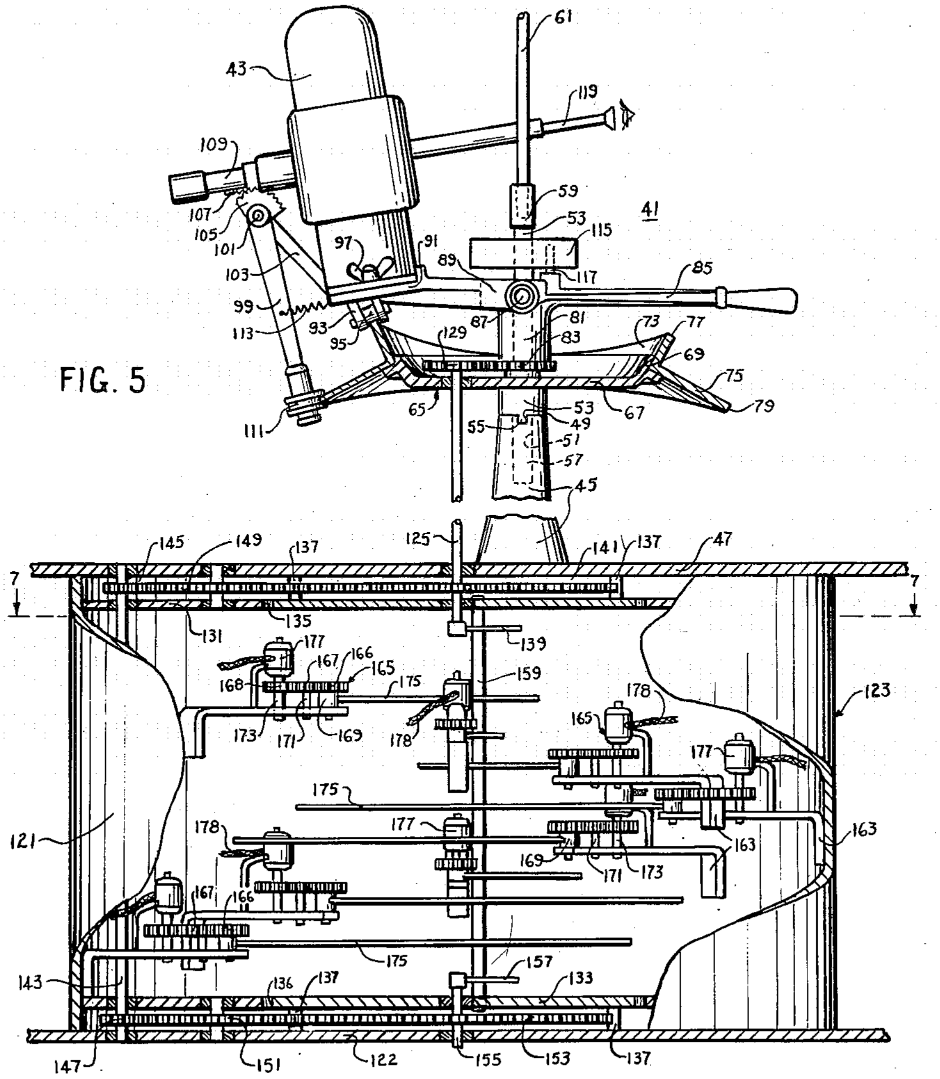
Figure 5 is an enlarged elevational view, partly cut away and partly sectioned, of a motion picture camera installation located at the master station of Figure 1, wherein azimuthal orientation is accomplished manually.
Figure 6:
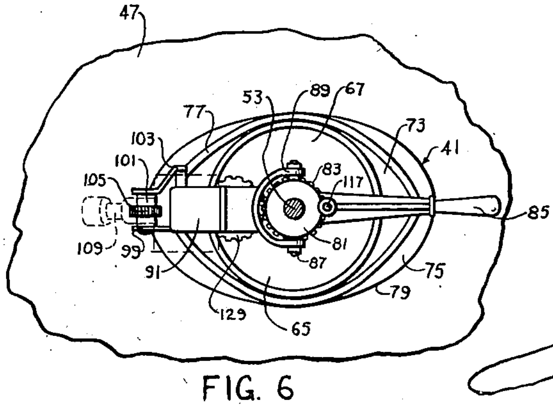
Figure 6 is a plan view of Figure 5, the camera being shown in phantom.
Figures 7, 8, 9, 10:
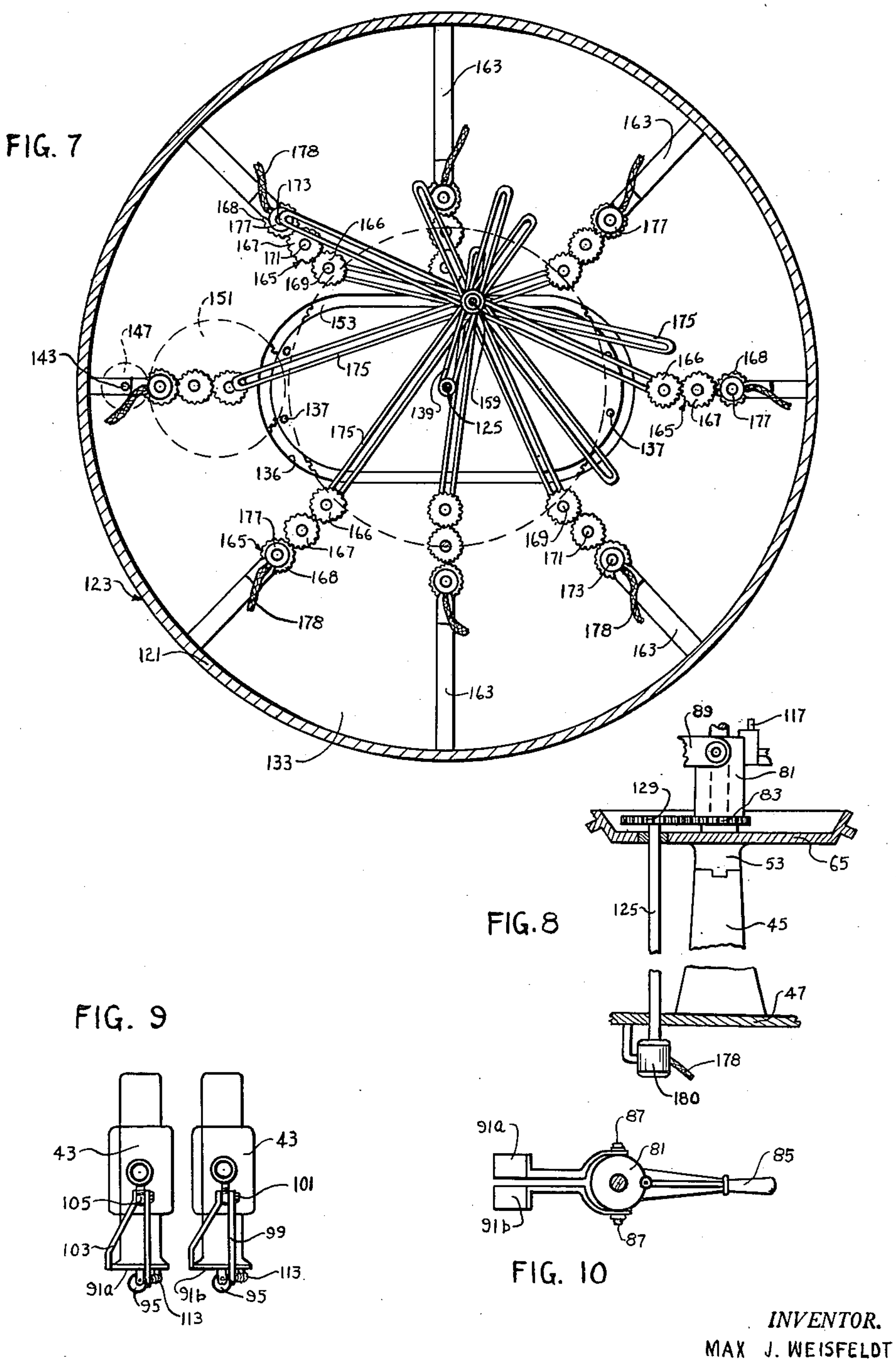
Figure 7 is a horizontal sectional view of the gear box of Figure 5, taken along the line 7—7 of said figure.
Figure 8 is a fragmentary, vertically sectioned view, similar to Figure 5, of the illustration located at each of the slave stations of Figure 1.
Figure 9 is a fragmentary elevational view, taken from the left of Figure 5, showing a modified structure wherein two cameras may be used to cover a wider horizontal scope.
Figure 10 is a fragmentary plan view of the camera brackets of Figure 9, the cameras being removed.

One form of camera orienting apparatus 41, adapted for a master station (and, with modifications, for a slave station), is shown in Figures 5–7. As there shown, said apparatus 41 includes a pedestal 45 which is secured to the floor 47 of the crow's-nest 37.

The top of said pedestal 45 is provided with a diametrically positioned transverse slot 49 and a downwardly extending axial bore 51. Positioned upon said pedestal 45 is a base 53 which is provided at its lower end with a transverse extension 55 positionable into the slot 49, and a downwardly extending axial leg 57 positionable into the axial bore 51. Said extension 55 and leg 57 cooperate to give the base 53 stability, to prevent it from rotating and also to facilitate the returning of the base 53 to its proper position in the event of its removal.

Securely fastened to the base 53 is a guide support 65 which consists of a horizontally disposed circular plate 67 bordered circumferentially by a channel 69. An elevation guide 73 and a lens focusing guide 75 are secured in the said channel 69. The elevation guide 73 is made of metal and its outer edge forms an elevation cam surface 77 so shaped as to vary the elevation of the camera 43 as it is revolved in azimuth. The lens focusing guide 75 is also made of metal and its outer edge forms a focusing cam surface 79 adapted to actuate the lens focusing mechanism as the camera is revolved.

The base 53 continues upward above the plate 67, but is of reduced diameter and at its upper extremity it is provided with an axially disposed socket 59 receivable to a central stock 61 of an umbrella-like canopy 39. Encircling the base 53, above the plate 67, and rotatably secured thereto by suitable bearings (not shown), is a collar 81, to the lower end of which is securely fastened an annular spur gear 83. A handle 85 extends outwardly radially from one side of the collar 81 and said collar is provided with two oppositely disposed radially extending gudgeons 87 positioned at right angles to said handle 85.

Rotatably mounted upon the gudgeons 87 is a yoke 89. Integral with said yoke 89 and extending outwardly from it, is a camera bracket 91. Secured to the lower surface of the camera bracket 91 and extending downwardly and inwardly therefrom are a pair of bosses 93 between which is rotatably secured a cam follower roller 95 which is positioned to cooperate with the elevation cam surface 77. The camera bracket 91 is provided with any suitable means to removably secure a camera 43 thereto, such as wing nuts 97.

The lens focusing mechanism consists of a focusing bar 99 rotatably positioned upon a horizontal stud 101 which is attached to the outer end of an arm 103, which is mounted on one side of the camera bracket 91 where it will not interfere with the camera 43. A sector pinion 105 is attached to and rotatable with the focusing bar 99. Said sector pinion 105 is in operative engagement with a rack 107 attached to the lower surface of the camera lens tube 109. The lower portion of the bar 99 is of cylindrical configuration and upon it there is slidably mounted a circumferentially slotted cam follower wheel 111. The lower end of the bar 99 is urged inwardly by a spring 113, so that the slotted cam follower wheel 111 is maintained in engagement with the focusing cam surface 79 of the lens focusing guide 75.

Rotatable about the base 53, above the collar 81, is a relatively heavy flywheel 115 which is preferably suitably internally geared so as to be set into relatively rapid rotation when actuated by an upwardly extending finger 117 attached to the handle 85.

For convenience in operation, the camera 43 may be provided with an elongated, backwardly extending view finder 119 of any suitable type.

Below the floor 47 of the crow's-nest 37 there is sustained a cylindrical gear box 123, which is made up of the cylindrical wall 121 and the circular bottom plate 122. The gear box 123 is fitted with upper and lower horizontally disposed cam plates 131, 133 which are cut through, respectively, by upper and lower oval-shaped cam slots 135, 136, in register with each other, which have the same geometrical contour, but on a miniature scale, as the race course 21. Said cam plates 131, 133 are fastened circumferentially to the interior of the cylindrical wall 121 and are also sustained by a number of feet 137 secured to the floor 47 and the bottom plate 122.

The camera orienting apparatus 41, already described, which is positioned above the floor 47, is coupled to said gear box 123 just described by means of a vertically disposed driver shaft 125, which extends through bearings in the circular plate 67 and the upper cam plate 131. Said driver shaft 125 terminates at its upper end in a spur-type coupling gear 129 in engagement with the annular spur gear 83 mentioned above, and is provided at its lower end, and just below the plate 131, with a horizontally disposed, elongated, longitudinally slotted, upper driver finger 139 which extends radially from said shaft. The said driver shaft 125 is coaxial with the cylindrical gear box 123.

A short auxiliary driver shaft 155 is positioned below the driver shaft 125 and coaxial with it and is rotatable in bearings in the bottom plate 122 and the lower cam plate 133. The upper extremity of said auxiliary driver shaft 155, just above the plate 133, is provided with a lower driver finger 157 which is a duplicate of the upper driver finger 139 already described and, as will be hereinafter seen, said fingers 139, 157 always move together so as to be mutually parallel under all conditions of operation.

The main and auxiliary driver shafts 125, 155 are geared together for synchronous rotation by a gear train which will now be described. Rigidly secured to the driver shaft 125 between the floor 47 and the upper cam plate 131 is a relatively large spur-type driver shaft gear 141. An upper intermediate spur gear 149 of a smaller diameter, which is in mesh with the gear 141, is also disposed between the floor 47 and the upper cam plate 131.

A rotatable transfer shaft 143 extends completely vertically through the gear box 123 at one side thereof and rigidly secured to its upper and lower ends respectively, for rotation with it, are identical relatively small upper and lower spur-type transfer gears 145, 147. The upper transfer gear 145, which is positioned between the floor 47 and the upper cam plate 131, is in mesh with the upper intermediate spur gear 149 already referred to. The lower transfer gear 147 is positioned between the lower cam plate 133 and the bottom plate 122 and is in mesh with a lower intermediate spur gear 151 which is a duplicate of the gear 149. Said gear 151 is in turn in mesh with an auxiliary spur gear 153 (a duplicate of the gear 141 aforesaid) which is rigidly secured to the auxiliary driver shaft 155 between the plates 133 and 122.

An elongated cylindrical cam follower rod 159 is disposed vertically within the gear box 123. Said rod 159 is provided at successive points along its length with a plurality (twelve being shown in Figure 5) of circumferential grooves. The upper and lower ends of said rod 159 extend respectively through the upper and lower cam slots 135, 136 and the upper and lower cam plates 131, 133 extend slidably respectively into the uppermost and lowermost grooves in said cam follower rod 159, so that said rod is adapted to be translated laterally to follow the oval-shaped contour of said cam slots.

The slotted upper driver finger 139 is coupled to the cam follower rod 159 just below the upper cam plate 131. Said rod 159 extends through the slot in said finger 139 and said finger extends into one of the circumferential grooves in said rod, thereby allowing the rod 159 to slide horizontally along the length of the finger 139. The lower driver finger 157 is similarly coupled to the cam follower rod 159 just above the lower cam plate 133.

It will be seen that rotation of the driver shaft 125 will cause synchronous rotation of the auxiliary driver shaft 155 by means of the gear train comprising the gears 141, 149, 145, 147, 151 and 153 and the transfer shaft 143. Upon such synchronous rotation of the shafts 125, 155, the upper and lower fingers 139, 157 will swing about the axis of said shafts and will carry the cam follower rod 159 along with them. As the opposite ends of said rod 159 are respectively imprisoned in the cam slots 135, 136, said rod will move along said slots and will therefore follow the same geometrical pattern as is followed, on a larger scale, by a horse 26 running around the race course 21.

Secured to the inner surface of the cylindrical wall 121 of the gear box 123, but each at a different level, are a plurality of radially positioned brackets 163 (eight being shown in Figures 5 and 7). Each bracket 163 supports an identical remote control servo unit 165, which includes a gear train of three spur gears 166, 167, 168 rigidly secured respectively to three vertically positioned shafts 169, 171, 173 which are rotatably sustained by said bracket 163.

The innermost shaft 169 of each servo unit 165 is provided with a horizontally disposed, flat, elongated remote control arm 175 which is longitudinally slotted and is slidably positioned in one of the grooves of the cam follower rod 159. The middle gear 167 of each servo unit 165 is merely an idler gear and the outermost shaft 173 of each such unit 165 is the shaft of a conventional driver servo motor 177 which is electrically connected, by means of a cable 178, to a companion driven servo motor 180 (see Figure 8) at one of the slave station subsidiary towers 44, as will be more specifically described hereinafter. The innermost shafts 169 are so positioned that (as shown in Figure 7) their axes intersect the cam plates 131, 133 at points which duplicate, in miniature, the actual geographical positions of the subsidiary towers 44 which house the slave installations.

It will now be seen that, when the cam follower rod 159 is caused to move along the cam slots 135, 136, the eight remote control arms 175 will follow it and thus will be swung about their respective axes of rotation with resultant rotation of the shafts 169. By means of the several gear trains, comprising the gears 166, 167, 168, such rotation will cause rotation of the respective shafts 173 of the several driver servo motors 177, which rotation will be remotely transmitted to the respective driven servo motors 180 located at the several slave stations in the subsidiary towers 44.

As each slave installation at one of the subsidiary towers 44 will only photograph the horses 26 as they pass along part of the course 21, the film transport mechanism of its camera 43 need only operate during such time. Hence, any suitable switching means (not shown) for starting the film transport mechanism as the horses 26 enter the portion of the course 21 covered by said slave camera and for stopping said film transport mechanism as the horses leave said portion should be provided. Such means for each slave installation will preferably be located at the slave station by such means for all of the slave stations may be located at the master station to be actuated as the master sighting means is swung in azimuth to track horses about the course 21.

The apparatus shown in Figures 5–7 may be modified to include means for operating a plurality of cameras 43 as indicated in Figures 9 and 10. As there shown, the apparatus is provided with two camera brackets 91*a*, 91*b* each of which is separately rotatably sustained by one of the gudgeons 87. Each of said camera brackets 91*a*, 91*b* is separately equipped with a cam follower roller 95 as already described and a lens focusing mechanism similar to that already described and shown in Figures 5 and 6.

Figures 11, 12:
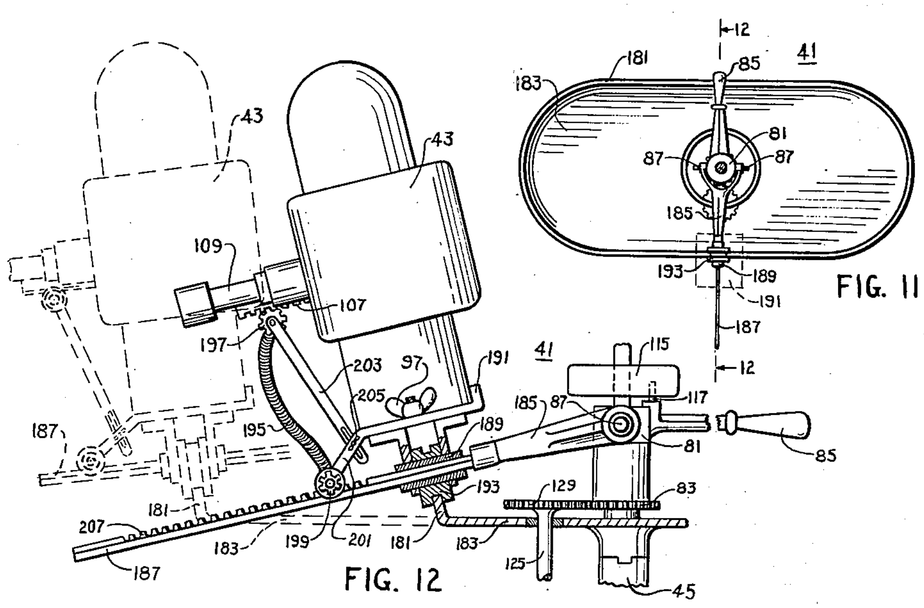
Figure 11 is a plan view of a second form (manually operated in azimuth, if at a master station) of a camera installation, wherein the camera itself has been removed and the camera bracket is indicated in phantom.
Figure 12 is an elevational view, partly sectioned along the line 12—12, of Figure 11, the relative positions of the parts when the camera is at a position 90° removed in azimuth being shown in broken lines.

A modified form of the present invention is shown in Figures 11–12. It is similar to the form of Figures 5–7 except as to the mechanisms for effectuating elevation adjustment and lens focusing. In this modified embodiment, the elevation guide is made up of a flange 181 extending upwardly from the periphery of a horizontal plate 183 which has substantially the same oval shape, but on a miniature scale, as the race course 21.

The collar 81, handle 85 and gudgeons 87 are similar to those already described in connection with Figures 5–7. The gudgeons 87 rotatably sustain a yoke 185, to which is secured an elongated elevation shaft 187 which is square in cross section. Slidably mounted upon said shaft 187 is a casing 189 which sustains a camera bracket 191. Encircling the casing 189 is a freely rotatable circumferentially slotted cam follower wheel 193.

The lens mechanism of the modification shown in Figures 11-12 consists of a flexible cable 195 which terminates at its ends respectively in upper and lower pinions 197, 199. The lower pinion 199 is sustained at the outer end of an arm 201 extending from the camera bracket 191; and the upper pinion 197 is sustained by a second arm 203 which is adjustably fastened to the arm 201 by means of a wing nut 205.

The lower pinion 199 is in mesh with a rack 207 set into the upper surface of the shaft 187. The upper pinion 197 is in mesh with a rack 107, which is attached to the lower surface of the lens tube 109.

A third form of the present invention (Figures 13-15) may utilize the elevation and lens focusing mechanism of either of the forms already described (Figures 5–7 and 11–12) or any other suitable mechanisms to accomplish the same purposes. This third form, however, differs from the others in that orientation in azimuth is accomplished automatically rather than manually.

Said third form of the present invention includes a pedestal 45 which sustains a base 209 provided with an upwardly extending base shaft 211. Rigidly sustained upon the base is a plate-like horizontally disposed guide support 213. Disposed in a circle about said support 213 and equidistant from the axis of the base shaft 211 are a plurality (sixteen being used in the illustrated embodiment) of upwardly extending pins 215 which are spaced about said support 213 in a predetermined manner, so that each pin 215 is associated with a particular position 1–16 located about the race course 21, as will become apparent hereinbelow.

The base shaft 211 terminates at its upper end in a socket 59 receivable to the stock 61 of a canopy 39. Above the guide support 213 and rotatable about the base shaft 211 is a tubular housing 219 which has fastened to its upper end a flat annular friction plate 221. Attached to the lower end of the said housing 219 is a coaxially disposed annular worm wheel 223, which is actuated by a worm 225 rotated by an electric motor 227 sustained by the guide support 213.

Resting frictionally upon the friction plate 221 is a cam plate 229. For the average race course 21 such as shown herein, the configuration of said cam plate 229 will probably be somewhat similar to that shown in Figure 14, where it is made up of two lobes of substantially equal size and shape. The configuration of said cam plate 229 will be further referred to hereinafter in connection with the operation of the present device.

Rigidly secured to the upper surface of the cam plate 229 and extending upwardly therefrom is a collar 231. The said cam plate 229 and collar 231 are rotatable as a unit about the base shaft 211. Extending radially from one side of said collar 231 is an arm 233 receivable to a handle (not shown) which may be attached only in the event that manual operation of the device is desired.

A camera bracket 91, variable in elevation, is attached to the collar 231 in a manner similar to that shown and described in in connection with Figures 5–7 above.

An annular spur gear 83 is secured coaxially to the collar 231 above the cam plate 229 and is adapted, either directly or through a suitable intermediate gear 238 or gears, to rotate a spur-type coupling gear 129, attached to the upper end of a driver shaft 125 which extends down into a gear box 123 (as shown in Figures 5 and 7).

Figure 15:
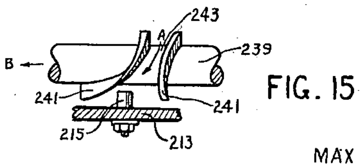
Figure 15 is an enlarged fragmentary elevational view of the pin and channel of the rotation adjustment mechanism of the device of Figure 13, taken along the line 15—15 thereof.

Fastened to the lower surface of the cam plate 229, to one side where it projects beyond the circumference of the friction plate 221, is an electric correction motor 237 to which is attached a short correction shaft 239. Extending helically around said correction shaft 239, are two flanges 241 which define a channel 243 (Figure 15). The said flanges 241 are spaced a greater distance apart at one end than at the other. The operation of the correction shaft 239 is controlled by a suitable switch mechanism and circuit (not shown) which causes said shaft to make a single revolution in the direction indicated by the arrow "A" (Figures 13 and 15) each time the electrical circuit is closed.

Mounted upon one side of the guide support 213 is a vertical bushing 245. Rotatably mounted through said bushing 245 is a shaft 247, to the upper end of which is attached a rheostat adjusting arm 249. Fastened to the end of said arm 249, and in operative engagement with the periphery to the cam plate 229, is a cam follower roller 251. The lower end of the shaft 247 is fastened to the contact arm 253 of a rheostat 255 which is located within the control box 257.

This third form (Figures 13-15) of the present invention may also have a flywheel 115 to assure smoothness of movement.

Electrical connections for the present modification may be by any suitable means, such as indicated by slip rings 259 extending about the housing 219 and spring contacts 261. The electrical circuit (Figure 14) for the motor 227 includes two rheostats 255, 263, a remote control switch 267 and a manual control switch 269, said latter switch being normally left in its closed position.

To use this third form (Figures 13-15) of the present invention at the race course 21 shown in Figure 1, there would be sixteen of the pins 215. At each of the sixteen positions 1-16 located about the race course 21 itself, there would be a suitable electrical contact means (not shown). Such contact means would preferably be a photoelectric cell (not shown), the beam of which would be cut by the horses 26 as they passed by that particular position 1-16 on the course 21 so as to close the electrical circuit. Said electrical contact means might of course be merely a contact button pressed by an operator. When such contact means is actuated, the electrical circuit is closed so as to cause the shaft 239 to make its single revolution, as described above.

The three forms (Figures 5-7, 11-12 and 13-15) of my invention, as already described, may be used in a master installation. When so used, each form includes the gear box 123 (Figures 5 and 7) or some substitute therefor.

Either of the forms shown in Figures 5-7 or 11-12 may be used at each of the slave stations located at the several subsidiary towers 44, except that the gear box 123 is then omitted, and the shaft 125 is connected directly to 180 (Figure 8). Said follower servomotor 180 is electrically connected to that leader servomotor 177, in the gear box 123 at the master station, which is located in the position similar to the geographical position of subsidiary tower 44 housing said slave installation. Thus, the azimuthal positions of the shafts 169 of the several servo units 165 located in the gear box 123 at the master station are transmitted, respectively, to the cameras 43 of the several slave stations. Of course, conventional auxiliary power booster means (not shown) may be interposed at each slave station to provide sufficient power to operate said slave installation if the servo system alone does not provide it.

In connection with all of the forms of my invention described above, it is advisable that suitable markers 271 be placed at a plurality of points along the race course 21. These markers 271 may be wooden signs attached to both sides of the inner rail 23 which signs are marked with letters or numbers and should be so positioned that they will be photographed by the cameras 43 in both the master tower 29 and those slave towers 44 which cover that portion of the track. The purposes of these markers 271 will be made clear hereinafter.

The operation of the first form of my invention (Figures 5–7) is as follows:

The camera 43 is loaded with film and attached to the camera bracket 91 so that the sector pinion 105 is in mesh with the rack 107 on the camera lens tube 109.

When the horse race starts, the operator need only flip a switch (not shown) to start the operation of the film transport mechanism of the master camera 43 and then follow the horses 26 in azimuth around the course 21 by tracking them through the view finder 119 and rotating the camera 43 in azimuth by means of the handle 85. The flywheel 115 acts as a damper and keeps the camera 43 from making any jerky or sudden movements.

As the camera 43 is swung in azimuth, the cam follower roller 95 rolls along on the elevation cam surface 77 thereby varying the angle of elevation of the camera. The shape of said cam surface 77 is predetermined so as to give the camera 43 the proper elevation to sight it at the part of the course 21 at which it is directed by its position in azimuth. Thus the camera 43 will have a relatively high elevational position when the horses 26 are at distant parts of the course 21 (as at the ends thereof) and a relatively low elevational position when they reach parts of the course 21 closer to the master tower 29 (as at the sides). This is clearly shown in Figure 3.

Likewise, as the camera 43 is revolved in azimuth, its lens tube 109 will be moved in and out by means of the lens focusing mechanism. The predetermined shape of the focusing cam surface 79 is then such as to cause the lens to be moved to its proper longitudinal position for best focus for the distance between camera 43 and horses 26 at each position of azimuth. As the camera 43 is swung about, the cam follower wheel 111 follows the shape of the focusing cam surface 79. This obtains despite vertical movements of the focusing bar 99 resulting from the undulations of the elevation cam surface 77, as the cam follower wheel 111 is free to slide longitudinally along said bar 99. The cam follower wheel 111 is kept in contact with the focusing cam surface 79 by means of the spring 113. As the bar 99 rotates about the stud 101, the sector pinion 105 rotates with it and actuates the rack 107 so as to cause the lens tube 109 to move longitudinally to its position of proper focus.

As the camera 43 is oriented in azimuth by means of the handle 85, the annular gear 83 rotates the coupling gear 129 and the driver shaft 125. As already explained above, as said shaft 125 is rotated, the upper and lower driver fingers 139, 157 swing in azimuth and cause the cam follower rod 159 to slide along the cam slots 135, 136. As the driver shaft 125 is geared directly to the collar 81, at any particular instant of operation, the upper and lower fingers 139, 157 will intersect the cam slots 135, 136 at a point analogous to the point along the actual race course 21 which will be intersected by the axis of the camera lens.

Thus as the camera 43 is revolved in azimuth to track horses 26 running around the course 21, the cam follower rod 159 will move along the cam slots 135, 136, to simulate said horses. As the cam follower rod 159 moves along the cam slots 135, 136 the several remote control arms 175, being individually slidably and rotationally coupled thereto, will be swung around with it, so that the axis of each of said arms 175 will also intersect the cam slots 135, 136 at the same point where it is intersected by the fingers 139, 157, namely at the said rod 159.

As the cameras 43 at the slave stations at the several subsidiary towers 44 will be oriented in azimuth respectively in synchronism with the azimuthal positions of the servomotors 117 located in the gear box 123, said cameras 43 will likewise be directed at the horses 26 running about the course 21.

Thus, it is seen that, as the camera 43 in the master station (in tower 29) tracks the horses 26 moving about the course 21, the cameras 43 in the several slave stations (in towers 44) will likewise at all times be caused to track said horses.

It will be understood that, at the master station the film transport mechanism of the camera 43 may be controlled by the operator. However, at the slave stations, any suitable electrical switching means (not shown) may be incorporated into the apparatus already described so that the film transport mechanisms of the cameras 43 located at said slave stations will operate only during the time that the horses are passing through the sectors of the course 21 covered respectively by said slave cameras. Such switching may be accomplished by using conventional apparatus and is not specifically a part of the present invention.

In the event that but one master tower 29 is used to cover a race course 21, the camera 43 therein will be revolvable through the entire 360° azimuth circle. Should it be deemed advisable, however, at a particular race course 21, to use several master stations located, for instance, in separate towers 29, 29*a*, 29*b* in the central field 27 (Figure 4), then each of the cameras 43 in such towers will be used to cover the action only in certain limited sectors of the course 21 and to control only those slave stations also covering such sectors.

For example, should a race on the course 21 shown in Figure 4, be run in a counterclockwise direction, from position 6 to the "finish line" at position 1, the camera 43 in the tower 29b to the right would follow the horses 26 from the start at position 6 until they had gotten beyond position 7. During this interval the slave station located in the subsidiary tower 44, proximate to position 6 would also follow the horses 26 under the guidance of said master station in tower 29b.

Just before the horses 26 reached position 7, the master station in the middle tower 29 would have picked up the horses 26 and would then track them until they had passed beyond position 9. During this time, the slave station located near position 8, under the guidance of said master station, would also have followed the horses 26.

Just before the horses 26 reached position 9, the master station in tower 29a to the left (Figure 4) would have picked them up and would follow them completely around the left end of the course 21 until they got beyond position 15. During this time the slave stations in the towers 44, proximate respectively to positions 10, 12 and 14, would also have followed the horses 26 through their respective sectors under the guidance of said master station in tower 29a.

Just before the horses 26 reached position 15, the master station in tower 29 would again have picked them up and would track them through to the finish line at position 1, and during this portion of the race, the slave station at tower 44 near position 16, under the guidance of said master station would follow them also.

Another possible arrangement would have been to utilize the three central towers 29, 29a, 29b and the eight subsidiary towers 44 (shown in Figure 4), but to have all of them, except tower 29, operate as slave stations. Then the master installation in tower 29 would control the slave installations in the tower 29a and 29b as well as in the eight subsidiary towers 44. Said master station in tower 29 would track the entire course 21, but the film transport mechanism of the camera 43 of each station would only operate while tracking the sectors of the course 21 between correction positions 7 and 9 and positions 15 and 1. Each of the remote slave stations in the subsidiary towers 44 would cover its limited sector of said course 21, as already described hereinabove, and the two slave stations in the central towers 29a, 29b would cover, respectively, the opposite ends of the course. Thus the slave station in tower 29a would cover the left end of the course 21 from position 9 counterclockwise to position 15 and the station in tower 29b would cover position 1 through position 7. In such installation, the two slave stations in towers 29a, 29b would be guided respectively by servo units 165 (not shown) suitably installed in the gear box 123 (Figures 5, 7).

It will be noted that, in the foregoing illustrations there is preferably a slight overlapping of coverage of a race at points along the course 21 where one camera 43 stops and another starts. This slight duplication may be valuable to show fouls and the like, as the horses 26 at these points will be viewed from different perspectives by the several cameras 43, but, if a complete motion picture of a race is desired as for newsreel purposes or the like, this slight duplication may be eliminated when the film is cut and spliced for the final picture.

Frequently, in a horse race, there is some spread between the fast and slow horses and it may be important, for various reasons, to photograph all of the horses in the race. One camera may not conveniently be provided with a sufficiently wide angle lens to take the entire field and it may therefore be advisable to use two or even more cameras in each master and/or slave station. A modification of my invention, using two cameras, is shown (Figures 9 and 10) wherein both the elevational position and the focus of the lens of each camera 43 may be separately adjusted as indicated, the respective mechanisms for each camera being similar to those shown for one camera in Figures 5 and 6.

In the second form of my invention (Figures 11–12) the upper surface of the flange 181 is perfectly level. However, in the operation of said form, as the operator revolves the camera 43 in azimuth, by means of the handle 85, the cam follower wheel 193 is caused to slide longitudinally along the shaft 187 by the predetermined oval shape of said flange 181. Thus the elevational position of the camera 43 is thereby varied, so that it is at all times directed at the course 21.

Also, as the camera 43 is revolved in azimuth and is caused to slide back and forth along the length of the shaft 187, the lower pinion 199 is caused to rotate by means of the rack 207. Said rotation is communicated through the flexible cable 195 to the upper pinion 197 which in turn, by means of the rack 107, moves the lens tube 109 in and out to suitably focus the camera 43.

Under some circumstances the lens focusing device may be disconnected as, for instance, where the lens used can be set at infinity to cover all portions of the course 21 to be covered by it.

In the operation of the third form of my invention (Figures 13–15), which is designed only for operation at a master station, the camera 43 is oriented so as to track the horses 26 mechanically in azimuth as well as in elevation, and focusing is also accomplished mechanically. The particular embodiment shown in the drawings (Figures 13–15) is designed to utilize the means for orienting in elevation and for adjusting focus, already described in connection with the first form of my invention (Figures 5–6). Thus the discussion of the operation of said third form of the device will be limited to the orientation in azimuth, that being the main feature of said third form of the invention. It will be understood that said modification may, of course, be provided with any other suitable means for orienting in elevation and for lens focusing.

The principle of operation of the present form of the invention (Figures 13–15) is that the camera 43 is swung in azimuth at a predetermined angular velocity so as to follow the horses around a particular course 21 at a speed which experience and tests will show is the average under normal conditions. This is effectuated by the motor 227 which is started at the start of the race by closing switch 267 (switch 269 being normally closed). Operation of said motor 227, by means of the worm 225 and worm wheel 223 causes rotation of the annular housing 219 and the friction plate 221 secured to the upper end thereof. This likewise cause rotation of the cam plate 229 which is in frictional engagement with said friction plate 221, and rotation of the collar 231 which is secured to said cam plate 229, thereby swinging in azimuth the camera bracket 91 and the camera 43 positioned thereon.

Thus it is seen that the angular velocity of azimuthal rotation of the camera 43 is dependent upon the speed of the motor 227. This speed is controlled by the rheostats 255, 263. Rheostat 255 is varied by the rheostat adjusting arm 249 which is swung about the axis of the shaft 247 as the cam follower roller 251 follows the non-circular periphery of the cam plate 229. The shape of said cam plate 229, as already pointed out above, is predetermined so that it will adjust the speed of the motor 227 by means of the rheostat 255 so the camera 43 will be swung in azimuth to track horses 26 as they would run a normal race about the course 21.

Thus, while the horses 26 run around the ends of the course 21, the angular velocity of the camera 43 should be relatively low as the horses 26 are then at a relatively great distance from the camera. The angular velocity should be speeded up, however, as the horses run along the sides of the course 21, as then greater angular velocity is requisite to keep tracking them.

Also, if tests indicate that the average speed of the horses 26 diminishes some throughout the progress of a normal race, this factor should also be included in determining the shape of the cam plate 229. It will be understood that for race courses 21 where races are run utilizing different starting and/or finish lines, it might be advisable to provide several interchangeable cam plates 229.

When it can be determined before a particular race that it will probably be run faster or slower than normal (as when the condition of the track, due to weather conditions or other factors, is what is referred to as "fast" or "slow"), then a preliminary adjustment of the manually operated rheostat 263 may be made. Also, said rheostat 263 may be varied during the course of a race if the operator finds that it was not adjusted with sufficient accuracy before the race started.

Now it will be appreciated that, despite past experience and tests, the accurate predetermination of the shape of the cam 229 and the manual adjustments of rheostat 263, the horses 26 may nevertheless not run exactly in the manner for which the apparatus has been set. The error should be small but, nevertheless, checks must be made as the race progresses and any errors must be corrected. Such correction is accomplished by means of the motor 237, the sixteen pins 215 and their associated parts.

Although the course 21 illustrated in the drawings (Figures 1 and 4) has been shown for convenience to have sixteen correction positions, this number may be more or less, as experience dictates is necessary for a particular course. The sixteen pins 215 will be so spaced that, when the camera 43 is located in azimuth so as to be directed at a particular one of the sixteen correction positions 1–16 about the course 21, the particular pin 215 associated with said particular position will be immediately below the channel 243 about the corrector shaft 239. Thus, if a race is run exactly as predetermined, when the horses 26 reach any particular one of the correction positions 1–16 about the course 21, the particular pin 215 associated with that position will be directly centered in the channel 243 when the corrector shaft 239 is rotated, and the apparatus will continue to operate without correction, just as if the motor 237 and pins 215 were inoperative.

It will be remembered that, when the horses 26 reach each correction position 1–16 along the course 21, an electrical contact (not shown) is closed (as by the horses 26 cutting the beam of a photoelectric cell or by any other suitable means) whereupon the shaft 239 is caused to make a single revolution. Thus, if the camera 43 is correctly oriented in azimuth so as to be directed at one of the correction positions 1–16 along the course 21 at the instant that the horses 26 reach that same correction position, then, as already stated, the pin 215 associated with that position will ride freely through the channel 243 as the connector shaft 239 makes its single revolution, and no correction will occur.

However, if for one reason or another, as the horses 26 reach one of the correction positions 1–16, the camera 43 is either leading or lagging the horses slightly, when the shaft 239 rotates, one or the other of the flanges 241 will impinge against the pin 215 associated with that position. As said channel 243 narrows toward one end and the pin 215 is immovable, the said flange 241 and the motor 237 to which it is attached and the cam plate 229 to which said motor is attached will all be displaced slightly. Such displacement will be possible by reason of the fact that the frictional engagement between the said cam plate 229 and the friction plate 221 will allow relative motion between them.

Figure 14:
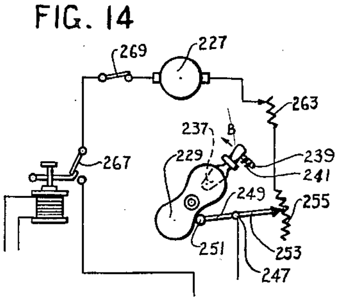
Figure 14 is a diagrammatic representation of an electrical circuit of the embodiment shown in Figure 13.

The foregoing will be better understood if the operation of the apparatus is studied during the progress of a race. If a race is to be run on the course 21 of Figure 1, from correction position 6 counterclockwise to correction position 1, the camera 43 in the tower 29 is revolved before the race, either manually or by means of the motor 227, so as to be sighted at position 6. As the race starts the film transport mechanism of the camera 43 is started and the switch 267 (Figure 14) is closed to start the motor 227. As already described, the operation of said motor 227 causes the camera 43 to be rotated in azimuth in a counterclockwise direction about the axis of the base shaft 211. The correction motor 237, the correction shaft 239 and the helical flanges 241 will also swing around said shaft 211 in a counterclockwise direction, as indicated by the arrows "B" (Figures 14 and 15).

Figure 13:
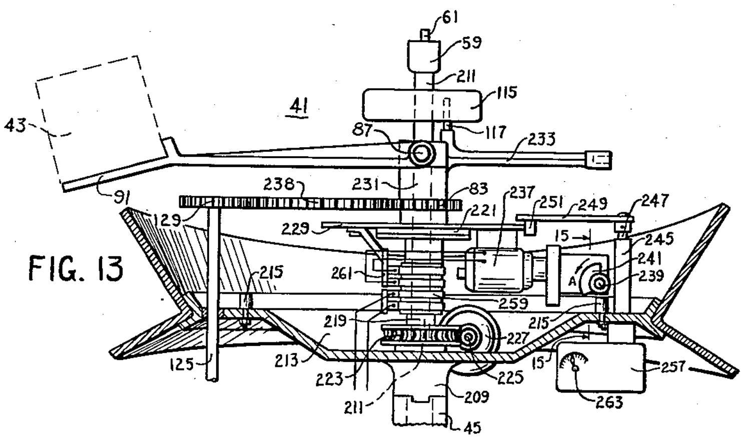
Figure 13 is a fragmentary elevational view of a third form of my invention wherein the orientation of the camera (when located at the master station), including orientation in azimuth, is completely automatic.

If the horses 26 are running at their normal speed, as predetermined, then the angular velocity of the camera 43 is such that, throughout its rotation in azimuth, it is continuously aimed at the running horses 26. As the horses 26 reach correction position 7, the electrical contact as described above for said position 7 is closed, thereby causing the correction shaft 239 to make its single turn about its axis. As said turn begins the pin 215, which is associated with position 7, is immediately below the correction shaft 239 and intermediate the flanges 241 (as shown in Figures 13 and 15) and hence, as said flanges revolve about the axis of the shaft 239, in the direction of the arrows "A" (Figures 13 and 15), they pass on opposite sides of the said particular pin 215, the pin being at all times midway between them.

The camera 43 continues to swing in azimuth and to follow the horses 26 from correction position 7 to position 8, at which time the electrical contact at position 8 closes causing the correction shaft 239 to again make a single turn, but at this time said shaft has reached a point immediately above the next succeeding pin 215, which is associated with position 8, and hence, as said shaft 239 rotates, the flanges 241 pass on opposite sides of that pin.

This procedure repeats itself and, as the horses 26 successively pass each of the correction positions 9–16, the shaft 239 makes its single turn and the flanges 241 pass successively on opposite sides of the particular pins 215 associated respectively with those particular positions. When the horses 26 have reach the finish line, the operator opens the switch 267 so as to stop the swinging of the camera 43 and he also stops the film transport mechanism within the camera.

During the operation of the master station in tower 29 as just described, the several slave stations in the several subsidiary towers 44 will have been operating just as already described hereinabove in connection with the device shown in Figures 5–7, except that rotation in azimuth of the several cameras 43 will be accomplished remotely. That is, the rotational movements of the camera 43 at the master station (see Figures 5 and 7) will cause nonsynchronous rotation of the several servo driver motors 177, which in turn will induce synchronous rotation in the respective driven servomotors 180 at the several slave stations 180 (Figure 8). This will cause rotation of the several shafts 125 at said slave stations and, by means of the gears 129, 83, azimuthal rotation of the several cameras 43 at said slave stations.

Now, however, if a race is run which does not conform to the anticipated average speed, when the horses 26 reach correction position 7 and the electrical contact at that position is made, the axis of sight of the master camera 43 will be either a little to the left or to the right of said position 7. If it is to the left, the flanges 241 will be a little to the left of where they are shown in Figure 15; if to the right they will be a little to the right. Then, in either case, as the shaft 239 makes its single turn, one or the other of the flanges 241 will strike against that pin 215 associated with correction position 7. When the narrow portion of the channel 243 reaches the said pin 215, the pin will be in its proper place in the center of said channel and the camera 43 will have been forced to swing slightly in azimuth, in one direction or the other in relation to the friction plate 221, the frictional engagement between the cam plate 229 and the said friction plate being loose enough to allow the one to slide over the other. Thus, the camera 43 will then be in its proper position so to be directed at correction position 7 when the horses 26 are at that position.

As the horses 26 then move from correction position 7 to position 8, the camera 43 will again follow them and at position 8, the procedure just described will again occur and the axis of sight of the camera 43 in relation to the horses 26 will again be corrected. This same sequence will be repeated as the horses 26 reach each of the positions 9–16.

The flanges 241 will of course be spaced far enough apart at the wide end of the channel 243 so that they will always pass on opposite sides of one of the pins 215, whether the camera 43 is leading or lagging the horses, and this even though the difference between the actual location of the camera 43 and its correct location be the predetermined maximum possible error.

It is desirable that a sufficiently large number of positions 1–16 on the race course 21 be used in setting up this form (Figures 13–15) of my invention so that the maximum error at any correction position 1–16 will never be so great as to allow the flanges 241 to be rotated without catching the proper pin 215 between them, or so great that the camera 43 will not photograph the horses. Experience may show that as few as eight correction positions about the course 21 and eight pins 215 about the guide support 213 are sufficient. On the other hand, accurate operation may necessitate a plurality in excess of sixteen of said positions 1–16 and pins 215.

The rheostat 263 may be set in advance by the operator to adjust for any variable factors which may be determinable before a particular race. Thus, if the weather is clear and the track "fast," said rheostat 263 may be set so that the motor 227 will run a little faster than average. Similarly, an adjustment of rheostat 263 may be made if it is known in advance either that all of the horses 26 running in a particular race are relatively fast or relatively slow. Again, the operator may adjust the rheostat 263, during the course of a race, should he find that, as each of the positions 1–16 is reached, the camera 43 is consistently ahead of or consistently behind its proper location. Or rheostat 263 may be completely automatically adjusted by a mechanism (not shown) which is motivated according to which of the flanges 241 strikes pin 215 at each position 1–16.

In any of the forms of my invention the several cams used in the elevational positioning mechanisms and the lens focusing mechanisms may be removable and replaceable by others having different curves and characteristics, so that the apparatus, if it is desired, may be usable on different race courses 21 or with different camera and lens combinations. Also said cams may be made adjustable for the same purpose.

A modified view finder 119 might also be substituted within the purview of the present invention. For instance, the view finder might be no more than a pair of sights, similar to gun sights, which could be so placed that the operator would keep them lined up on the head of the first horse. As a matter of fact, as sighting need be done only in azimuth, the sighting means might be no more than a pair of vertical wires, one behind the other. It would be thus possible to eliminate expensive optical view finders as it would be only necessary to line up the sight on the first horse and swing the camera 43 horizontally.

When the present invention is used to photograph a horse race, as illustrated in the drawings and described above, it will be understood that speed in collecting the film and preparing it for projection will be an important factor, particularly in connection with the discovery and proof of fouls and newsreel use of the film. Such speed may be accomplished in various ways. For instance, the lengths of film used in loading the various cameras 43 may be no longer than will be needed for an individual race and this film may be loaded in magazine form (not shown) so that it may be rapidly and easily loaded into the cameras and removed therefrom.

Also the entire slave installation in each subsidiary tower 44 may be mounted upon a platform (not shown) which is movable vertically, like an elevator, from its operating position in the crow's-nest 37 down to the ground. The vertical movements of said several platforms may be controlled from the master station so that, before each race, they may be raised to put the cameras 43 into operating position and, after each race, they may be lowered to allow rapid removal of the exposed film by an operator at ground level. Then after each race, an operator may make a rapid circuit (as in a "jeep") of the several slave stations in the towers 44. At each of said towers 44 he would remove the film magazine and reinsert a fresh magazine for the succeeding race. The operator at the master station (in tower 29) would lower the film magazine removed from the master camera 43 to the ground by any suitable means so that it too could be picked up by the operator on the ground. Said operator on the ground would then take all of the magazines to a convenient laboratory upon the grounds for rapid processing by automatic machines. By such procedure, motion pictures of a race could be ready for projection within a very short time, undoubtedly before the running of the next race.

It is to be noted that if, in a particular race, a charge is made that a foul occurred at some particular locality about the race course 21, it would be possible to concentrate on the processing of the film from the master camera 43 and only such slave camera 43 or cameras as covered by that portion of the course 21. Also as the numbered or lettered markers 271 located about the course 21 would be visible in the processed film, it would be necessary to project only such portion of the film as included the place where the alleged foul occurred.

Again, a miniature automatic film processing unit (not shown) might be installed at each tower 29, 44. Then, as the film was exposed at each tower, it would be fed automatically into the said processing unit. Then, after each race, the operator on the ground would pick up a completely processed reel of film at each station which he could then take to a projection room (located below the grandstand, in the judges stand or any other suitable place) for immediate viewing.

As one of the slave stations could be located so as to be aligned with the finish line of the course 21, any question as to the winner of a particular race and the placing of the succeeding horses could also be resolved by the used of the present invention.

It should be pointed out that the towers 29, 44 should preferably be as tall as possible as this will allow the camera 43 to be sighted at a more downward angle of elevation. This is helpful in discerning fouls, as better visibility is had down between horses 26 running side by side. As several cameras 43 (at the master station and at one or more slave stations) will cover every bit of a race from start to finish, and as said cameras will be directed at the horses 26 from different angles, no "blind" spots will occur. The photographic coverage will be so complete that contemplated fouls will be stillborn.

While I have herein described and upon the drawings shown exemplifications of my invention, it is to be understood that my invention is not limited thereto but may comprehend other construction, details, arrangement of parts, and features without departing from the spirit thereof, and the scope of the claims shall govern the protection of the present patent.

Having thus disclosed the invention, I claim:

1. In an apparatus for recording images of a subject moving along a predetermined course, a master station, means at said master station for tracking said subject as it moves along said course, a slave station, means at said slave station orientable in azimuth and elevation for recording images of said subject as it moves along said course, remote control means between said master and slave stations to automatically orient in azimuth the image recording means to follow in azimuth a subject moving along said course upon orientation of the tracking means, and means to automatically orient in elevation the image recording means according to a predetermined relation to its orientation in azimuth to follow in elevation said subject moving along said course, so that as a subject is tracked by the tracking means from the master station as it moves along the course images of said subject may be simultaneously recorded by the image recording means from the slave station, wherein the remote control means include cam means having the same configuration as the course but on a miniature scale, cam follower means to represent the position of the subject as it moves along the course, a driver finger representing the axis of sight of the tracking means but on the same miniature scale and adapted to move said cam follower along said cam means, said driver finger being rotatable about an axis positioned relative to the cam means to represent to the same miniature scale the geographical position of the master station relative to the course, a rotatable shaft having a position relative to the cam means to represent to the same miniature scale the geographical position of the slave station relative to the course, a remote control arm coupling the cam follower and the shaft together and rotatable with said shaft about its axis, a servo system to transmit rotational movements of said shaft to the image recording means.

2. In an apparatus for recording images of a subject moving along a fixed path, a master station, tracking means at said master station to track said subject in azimuth along said path, a slave station, an image recording device at said slave station, said slave station being located so that the image recording device may record images of the subject along a limited portion of said path, a servo system between the master station and the slave station, said servo system including a driver motor and a synchronous driven motor, mechanical means to translate rotational movements in azimuth of the tracking means aforesaid into nonuniform rotational movements of the driver motor bearing a predetermined relationship to the said movements of the tracking means, means to rotate in azimuth the image recording device at the slave station synchronously with the movements of the driven motor aforesaid, said image recording device at the slave station being orientable in elevation, cam means at said slave station to control the elevation of said image recording device as said device is rotated in azimuth, whereby a subject moving along the path aforesaid may be tracked by the tracking means at the master station and the image recording device may be simultaneously automatically oriented in azimuth and elevation to follow the subject over the portion of the path aforementioned so that images of said subject may be recorded simultaneously by the image recording device at the slave station.

3. In an apparatus for recording images of a subject moving along a fixed path, a master station, tracking means at said master station to track said subject in azimuth along said path, a plurality of slave stations, an image recording device at each of said slave stations, each of said slave stations being located so that the image recording device thereof may record images of the subject along a limited portion of said path, the said slave stations being so located that every portion of the path is covered by at least one of the slave stations, a servo system between the master station and each of the slave stations, each such servo system including a driver motor and a synchronous driven motor, mechanical means to translate rotational movements in azimuth of the tracking means into a plurality of nonuniform rotational movements of the driver motors respectively, each of said nonuniform movements bearing a predetermined relationship to the said movements of the tracking means, means to rotate in azimuth the image recording devices at the several slave stations synchronously with the movements of the driven motors aforesaid respectively, the image recording device at each slave station being orientable in elevation, cam means at each of said slave stations to control the elevation of the image recording device as it is rotated in azimuth, whereby a subject moving along the path aforesaid may be tracked by the tracking means at the master station and the image recording devices at the several slave stations may be automatically oriented in azimuth and elevation to simultaneously follow the subject over the respective portions of the path aforementioned so that images of said subject may be recorded by the image recording devices at the slave stations simultaneously as the subject is tracked over the portions respectively of the course covered by said devices.

4. In an apparatus for taking motion pictures of horses racing about a race course, a master station, tracking means at said master station to track the horses in azimuth along said course, a slave station, a motion picture camera at said slave station, said slave station being located so that the camera may take suitable motion pictures along a limited portion of the course, a servo system between the master station and the slave station, said servo system including a driver motor and a synchronous driven motor, mechanical means to translate rotational movements in azimuth of the tracking means aforesaid into nonuniform rotational movements of the driver motor bearing a predetermined relationship to the said movements of the tracking means, means to rotate in azimuth the camera at the slave station synchronously with the movements of the driven motor aforesaid, said camera at the slave station being orientable in elevation, cam means at said slave station to control the elevation of said camera as said camera is rotated in azimuth, whereby horses racing along the race course may be tracked by the tracking means at the master station and said camera may be simultaneously automatically oriented in azimuth and elevation to follow the horses over the portion of the course aforesaid so that photographs of said horses may be taken simultaneously by the camera at the slave station.

5. In an apparatus for recording images of a subject moving along a course of predetermined configuration, a master station, a slave station, said master station including means orientable to track movements of said subject in azimuth, a cam plate provided with a cam slot which duplicates in miniature the configuration of the course aforesaid, a cam follower rod disposed at right angles to said plate and slidable along said cam slot, means coupling the tracking means aforesaid to the said cam follower rod to move said cam follower rod along said cam slot to duplicate in miniature movements along said course of a subject being tracked by said tracking means aforesaid, a rotatable shaft disposed at right angles to said cam plate and with its axis intersecting said plate at a point duplicating in miniature the geographical location of said slave station relative to said course, a remote control arm disposed at right angles to said shaft, and rotatable with said shaft, and slidably coupled to said cam follower rod, said slave station including an image recording device orientable in azimuth and elevation, servo means to transmit rotation of the shaft aforesaid synchronously to said image recording device to rotate it in azimuth, elevation cam means to cause the image recording device to be oriented in elevation as it is oriented in azimuth, said cam means having a predetermined relationship to the azimuthal positions of the said image recording device.

6. In an image recording apparatus for recording images of a subject moving along a fixed course, a master station located at a fixed geographical position relative to the course, a slave station located at a fixed geographical position relative to the course, a tracking means at said master station and having its axis of sight swingable in azimuth, means to vary the elevation of the axis of sight of said tracking means to vary the elevation according to a predetermined relationship to the azimuthal position thereof, cam means duplicating the fixed course in miniature, cam follower means adapted to follow said cam means, means to move the cam follower means along said cam means to duplicate in miniature the point of intersection between the fixed course and the line of sight of the tracking means, a remote control arm slidably coupled to said cam follower means, said remote control arm being swingable about an axis positioned relative to the cam means to duplicate in miniature the geographical position of the slave station relative to the course, a servo system to transmit rotational movements of said arm about such axis synchronously to said slave station, an image recording device rotatable in azimuth by said servo system in synchronism with the rotation of said remote control arm about said axis.

7. A gear box for an image recording apparatus comprising a master station and a plurality of slave stations disposed about a course of fixed configuration, comprising a housing, two cam plates disposed horizontally within said housing, each of said plates pierced by a cam slot of the same configuration as the course aforesaid but on a miniature scale, said cam slots being disposed in register, a vertical cam follower rod disposed slidably along said slots, a rotatable driver shaft extending vertically into said housing positioned with its axis intersecting said cam plates at a position relative to the cam slots which duplicates in miniature the geographical position of the master station relative to the course, a horizontal driver finger secured to said driver shaft and rotatable with it and slidably coupled to the cam follower rod, an auxiliary driver finger similar to the driver finger aforesaid geared to said driver shaft for synchronous rotational movements about the same axis as said driver finger, a plurality of driver servo units, said units respectively including a like plurality of vertical rotatable servo shafts within the housing the axes of which servo shafts respectively intersect the cam plates at positions relative to the cam slots which duplicate in miniature the geographical positions of the slave stations relative to the course, a like plurality of horizontal remote control arms secured respectively to said servo shafts and rotatable with said servo shafts and slidably coupled to the cam follower rod at different vertical levels.

8. In an image recording apparatus for recording images of horses running about a substantially oval race course, a master station located substantially in the center of said course, a plurality of slave stations located adjacent to the course, the master station including a tower, sighting means in said tower, said sighting means being rotatable in azimuth and in elevation, elevation cam means to control the elevational position of said sighting means according to a predetermined relationship between the azimuthal and elevational positions of said sighting means so as to keep said means sighted at the course as it is rotated in azimuth, mechanical means to translate the rotational movements in azimuth of the sighting means into a plurality of nonuniform movements, each having a predetermined relationship thereto, servo means to translate said nonuniform movements respectively to said slave stations, each servo means including a driver servo motor at the master station and a driven servo motor at one of the slave stations, the said driver motors being rotated respectively according to the nonuniform movements aforesaid, each slave station including a tower, image recording means in said tower, said image recording means being rotatable in azimuth and elevation, said image recording means being rotated in azimuth in synchronism with the driven servo motor at said slave station, slave elevation cam means at each slave station to control the elevational position of the image recording means according to a predetermined relationship between the azimuthal and elevational positions of said image recording means so as to keep it directed at the course as it is rotated in azimuth.

9. In an apparatus for recording images of a subject moving along a predetermined course, a master station, an image recording device at said master station, tracking means for said image recording device for tracking the subject as it moves along said course so that the image recording device may record images of said subject, a slave station, an image recording device at said slave station for recording images of said subject as it moves along a portion of said course, remote control means to orient the image recording device at the slave station to follow the moving subject along said portion of said course simultaneously as it is followed along said portion by the image recording device at the master station, said remote control means including mechanical means to translate rotational movements of the image recording device at the master station into nonuniform rotational movements according to a predetermined relationship with said rotational movements of the image recording device at the master station and also servo means for rotating the image recording device at the slave station synchronously with said nonuniform rotational movements, each of said image recording devices being orientable in elevation and being provided with elevation adjusting means to automatically vary its elevation according to a predetermined relationship to its azimuthal position.

MAX J. WEISFELDT.

REFERENCES CITED

The following references are of record in the file of this patent:

UNITED STATES PATENTS

| Number | Name | Date |
|---|---|---|
| 946,800 | Groff | Jan. 18, 1910 |
| 1,167,247 | Anderson | Jan. 4, 1916 |
| 1,463,446 | Snowden | July 31, 1923 |
| 1,602,499 | Meinecke | Oct. 12, 1926 |
| 1,692,364 | Akemann | Nov. 20, 1928 |
| 1,747,664 | Droitcour | Feb. 18, 1930 |
| 1,856,432 | Rudolph et al. | May 3, 1932 |
| 1,982,322 | Ries et al. | Nov. 27, 1934 |
| 2,306,862 | Bown | Dec. 29, 1942 |
| 2,348,841 | Oswald | May 16, 1944 |
| 2,382,616 | Del Riccio | Aug. 14, 1945 |
| 2,408,528 | Nassour | Oct. 1, 1946 |
| 2,420,197 | Rosenthal | May 6, 1947 |

FOREIGN PATENTS

| Number | Country | Date |
|---|---|---|
| 341,508 | France | June 11, 1904 |
| 321,288 | Great Britain | Nov. 7, 1929 |
| 752,856 | France | July 31, 1933 |